United States Patent Office 3,010,789
Patented Nov. 28, 1961

3,010,789
CRYSTALLINE ZEOLITE H
Robert M. Milton, Buffalo, N.Y., assignor to Union Carbide Corporation, a corporation of New York
No Drawing. Filed Dec. 5, 1957, Ser. No. 700,736
15 Claims. (Cl. 23—113)

This invention relates to a novel composition of matter, and to a process for preparing and utilizing this novel material. More particularly, the invention is concerned with a novel, synthetic member of the zeolite family.

The term "zeolite," in general, refers to a group of naturally occurring, hydrated, metal aluminosilicates, many of which are crystalline in structure. The synthetic material of the invention has a composition similar to certain of the natural crystalline zeolites. Accordingly, the term "synthetic zeolite" is applied to the materials prepared by the process of the invention. There are, however, significant differences between the synthetic and natural materials. For convenience and distinguishability, the synethetic material of the invention will be referred to hereinafter as "zeolite H."

Crystalline zeolites structurally consist basically of an open, three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, e.g., alkali metal or alkaline earth metal ions. This balance may be expressed by the formula $2Al/(2Na, 2K, 2Li, Ca, Ba, Sr, etc.)=1$. Moreover, it has been found that one cation may be replaced for another by suitable exchange techniques. Consequently, crystalline zeolites are often employed as ion-exchange agents.

It is also known that the crystal structures of many zeolites exhibit interstices of molecular dimensions. The interstitial spaces are generally occupied by water of hydration. Under proper conditions, viz., after at least partial dehydration, these zeolites may be utilized as efficient adsorbents whereby adsorbate molecules are retained within the interstitial spaces. Access to these channels is had by way of orifices in the crystal lattice. These openings limit the size and shape of the molecules that can be adsorbed. A separation of mixtures of foreign molecules based upon molecular dimensions, wherein certain molecules are adsorbed by the zeolite while others are refused, is therefore possible. It is this characteristic property of many crystalline zeolites that has led to their designation as "molecular sieves." In addition to molecular size and shape, however, other factors may also influence the selective adsorption of certain foreign molecules by molecular sieves. Among these factors are: the polarizability and polarity of the adsorbate molecules; the degree of unsaturation of organic adsorbates; the size and polarizing power of the interstitial cation; the presence of adsorbate molecules in the interstitial spaces; and the degree of hydration of the zeolite.

A number of synthetic crystalline zeolites have been prepared. They are distinguishable from each other, and from the naturally occurring material, on the basis of their composition, crystal structure, and absorption properties. A suitable method for distinguishing these compounds, for example, is by their X-ray powder diffraction patterns. The existence of a number of zeolites having similar but distinguishable properties advantageously permits the selection of a particular member having optimum properties for a particular use.

The present invention has as its prime object the provision of a novel, synthetic, crystalline zeolite of the molecular sieve type. Another object is to provide a novel, synthetic, crystalline zeolite having useful ion-exchange and adsorption properties. A further object is to provide a convenient and efficient process for preparing the novel material of the invention.

The composition of zeolite H may stoichiometrically be expressed in terms of mole ratios of oxides. Thus, a general formula for zeolite H may be represented as follows:

$$1.0\pm0.1 M_{\frac{2}{n}}O:Al_2O_3:2.0\pm0.1 SiO_2:xH_2O$$

wherein "M" designates at least one exchangeable cation, as hereinbelow defined, "$n$" represents the valance of "M," and "$x$" may be any value from 0 to about 4. Minor variations in the mole ratios of these oxides, within the ranges indicated by the above formula, do not significantly change the crystal structure or physical properties of the zeolite. Likewise, the value of "$x$" is not necessarily an invariant for all samples of zeolite H. This is true because various exchangeable cations are of different size, and as no appreciable modification of the crystal lattice dimensions of the zeolite is effected by the exchange of these particular cations, more or less interstitial space should be available for the accommodation of water molecules. The value of "$x$" therefore depends upon the identity of the exchangeable cation, and also upon the degree of dehydration of the zeolite.

The exchangeable cations contemplated by the present invention include mono-, di- and trivalent metal ions, particularly those of groups I, II and III of the periodic table, as set forth in Webster's New Collegiate Dictionary 1956 edition, page 626, such as barium, calcium, cerium, lithium, magnesium, potassium, silver, sodium, strontium, zinc ions etc., and the like, and other cations, for example, hydrogen and ammonium ions, which, with zeolite H, behave like the metal ions mentioned above in that they may be replaced for other exchangeable cations without causing a substantial alteration of the basic crystal structure of the zeolite. Of the exchangeable cations, mono- and divalent cations are especially satisfactory to the invention since they ordinarily may more easily be included within the cavities of the zeolite crystal.

Although there are a number of exchangeable cations that may be present in zeolite H, it is preferred to synthesize the potassium form of the zeolite, i.e., the form in which potassium ions are included as the exchangeable cation. The reactants accordingly employed are readily available and generally water soluble. The potassium ions in the potassium form of zeolite H may then conveniently be replaced by other exchangeable cations, as will be shown below, thereby yielding isomorphic forms of the zeolite.

In an embodiment of the present invention, the potassium form of zeolite H is prepared by suitably heating an aqueous potassium aluminosilicate mixture whose composition, expressed in terms of mole ratios of oxides, falls within the following ranges:

$K_2O/SiO_2$ of from about 1 to about 4
$SiO_2/Al_2O_3$ of from about 1.5 to about 2.4
$H_2O/K_2O$ of from about 23 to about 34 whereby the desired product is crystallized out.

In making the potassium form of zeolite H, representative reactants are silica gel, silicic acid, or potassium silicate as a source of silica. Alumina may be obtained from activated alumina, alpha alumina, gamma alumina, alumina trihydrate, aluminum hydroxide, or potassium aluminate. Potassium hydroxide may supply the potassium ions, and, in addition, assist in controlling the pH of the reactant mixture. Preferably, the reactants are water soluble. A solution of the reactants, in proper proportions, is placed in a container, made, for example, of metal or glass. The container should be closed to prevent loss of water. A convenient and preferred procedure for preparing the reactant mixture is to make an aqueous solution containing the potassium aluminate and hydroxide, and add this, with agitation, to an aqueous solution of potassium silicate. The resultant mixture is then stirred to insure homogeneity.

For best results, the crystallization procedure is carried out at a temperature of approximately 100° C. The potassium form of zeolite H may, however, be satisfactorily prepared at temperatures of as low as about 75° C. and as high as about 120° C., the pressure being atmospheric, or at least that corresponding to the vapor pressure of water in equilibrium with the mixture of reactants at the higher temperature. Any suitable heating apparatus, e.g., an oven, sand bath, oil bath, or jacketed autoclave, may be used. Heating is continued until the desired crystalline zeolite product is formed. The zeolite crystals are then filtered off and washed to separate them from the reactant mother liquor. The zeolite crystals should be washed, preferably with distilled water, until the effluent wash water, in equilibrium with the product, has a pH of between about 9 and 12. As the zeolite crystals are washed, the exchangeable cation of the zeolite may be partially removed, and is believed to be replaced by hydrogen cations. If the washing is discontinued when the pH of the effluent wash water is about 10, the $K_2O/Al_2O_3$ molar ratio of the crystalline product will be between about 0.9 and 1.0. Excessive washing will result in a somewhat lower value for this ratio, while insufficient washing may leave slight excesses of potassium associated with the product. Thereafter, the zeolite crystals may be dried, conveniently in a vented oven. The product is thereby obtained having a composition, expressed in terms of mole ratios of oxides, corresponding to the general formula:

$$1.0 \pm 0.1 K_2O : Al_2O_3 : 2.0 \pm 0.1 SiO_2 : xH_2O$$

wherein $x$ may be any value from 0 to about 4.

Typical of the manner in which the potassium form of zeolite H may be prepared is the following example. A solution of potassium aluminate was prepared by initially mixing 5.15 grams of potassium hydroxide, 3 grams of aluminum hydroxide containing 0.0492 mole of $Al_2O_3$, and 18.7 ml. of water, and heating the mixture until the reactants dissolved. The solution was cooled to room temperature, and added to 8.5 grams of a potassium silicate solution containing 12.6 percent of $K_2O$ and 27.1 percent of $SiO_2$ by weight. The resulting mixture, having a composition, expressed in terms of mole ratios of oxides, as follows:

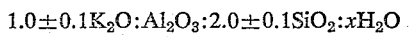

$K_2O/SiO_2$ of 1.5
$SiO_2/Al_2O_3$ of 2.0
$H_2O/K_2O$ of 24.9 was then stirred until homogeneous. Crystallization of the desired zeolite product was carried out by heating the reactant mixture in a sealed glass jar at a temperature of 100° C. for approximately 40 hours. The crystalline product which formed had thereupon settled to the bottom of the jar, and the reactant mother liquid was clear. The crystalline product was then filtered, washed with water until the effluent wash water had a pH of about 10.5 to 11.0, and dried. Analysis of the product showed it to be a zeolite having a composition, expressed in terms of mole ratios of oxides, corresponding to the formula:

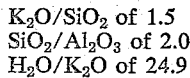

$0.97 K_2O : Al_2O_3 : 2.00 SiO_2 : 4H_2O$

Electromicrographs of the product showed the crystals to be in the form of hexagonal plates of from about 2 to about 4 microns in diameter.

The replacement of the exchangeable cation present in zeolite H at least in part by other cations may be accomplished by conventional ion-exchange techniques. A preferred, continuous method is to pack zeolite H into a series of vertical columns with suitable supports at the 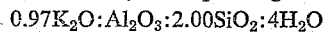 bottom; successively pass through the beds, at room temperature, a water solution of a soluble salt of the cation to be introduced into the zeolite; and change the flow from the first bed to the second as the zeolite in the first bed becomes ion-exchanged to the extent desired. To obtain hydrogen exchange, for example, a dilute water solution of an acid such as hydrochloric acid is effective as the exchanging solution. For sodium exchange, a water solution of sodium chloride or dilute sodium hydroxide is suitable. Other convenient reagents are: for potassium exchange, a water solution of potassium chloride or dilute potassium hydroxide; for lithium, barium, calcium, cerium, magnesium, silver, strontium, zinc, ammonium exchange, and the like, water solutions of the chlorides, sulfates or nitrates of these cations. While it is more convenient to use water soluble compounds of the exchangeable cations, other solutions containing the desired cations may also be employed. Moreover, particularly good results may be obtained by the utilization of an exchanging solution having a pH of between about 5 and 12.

In a typical exchange, 11 grams of the potassium form of zeolite H, obtained as heretofore described, were admixed with 400 ml. of a 1 molar aqueous sodium chloride solution. The mixture was stirred for about one-half hour, and allowed to stand overnight. Upon standing, the zeolite crystals were filtered, and the exchange process repeated as described above. The zeolite crystals were then refiltered, washed with distilled water, and dried. Analysis of the product indicated that approximately 91 percent of the potassium ions had been replaced by sodium ions.

Similar exchanges were conducted as follows: (a) 10 grams of the potassium form of zeolite H were treated with 750 ml. of an 0.1 molar aqueous calcium chloride solution, resulting in the exchange of approximately 91 percent of the potassium ions by calcium ions; (b) 8 grams of the potassium form of zeolite H were treated with 300 ml. of an 0.4 molar aqueous zinc nitrate solution, resulting in the exchange of approximately 67 percent of the potassium ions by zinc ions; and (c) 10 grams of the potassium form of zeolite H were treated with 200 ml. of an 0.5 molar aqueous barium chloride solution, resulting in the exchange of approximately 93 percent of the potassium ions by barium ions. Other exchanges were carried out utilizing an 0.1 molar aqueous magnesium chloride solution, an 0.1 molar aqueous silver nitrate solution, an 0.25 aqueous ammonium chloride solution, and an 0.075 molar aqueous solution containing cerous ions. Substantial portions of the potassium ions in the potassium form of zeolite H were replaced in each case by the cation of the exchanging solution.

In addition to composition, zeolite H may be identified and distinguished from other zeolites, and other crystalline substances, by its X-ray powder diffraction pattern, the data for which are set forth below in Tables A and B. In obtaining the X-ray powder diffraction patterns, standard techniques were employed. The radiation was the K-alpha doublet of copper, and a Geiger counter spectrometer with a strip chart pen recorder was used. The peak heights, I, and the positions as a function of $2\theta$, where $\theta$ is the Bragg angle, were read from the spectrometer chart. From these, the relative intensities, $100 I/I_0$, where $I_0$ is the intensity of the strongest line or peak, and $d(A.)$ observed, the interplanar spacing in Angstrom units, corresponding to the recorded lines were determined.

X-ray powder diffraction data for a sample of the potassium form of zeolite H, ($K_2H$) and for isomorphic forms of the zeolite in which varying amounts of the potassium ions had been replaced by other exchangeable cations, as heretofore described, viz., a sodium exchanged zeolite H ($Na_2H$), an ammonium exchanged zeolite H ($[NH_4]_2H$), a magnesium exchanged zeolite H (MgH), a cerium exchanged zeolite H ($Ce_2H_3$), a calcium exchanged zeolite H (CaH), and a zinc exchanged zeolite H (ZnH), are given in Table A.

Occasionally, additional lines not belonging to the pattern for zeolite H appear in a pattern along with the Table A

| K₂H | | Na₂H | | (NH₄)₂H | | MgH | | Ce₂H₃ | | CaH | | ZnH | |
|---|---|---|---|---|---|---|---|---|---|---|---|---|---|
| $d$(A.) | $100I/I_0$ | $d$(A.) | $100I/I_0$ | $d$(A.) | $100I/I_0$ | $d$(A.) | $100I/I_0$ | $d$(A.) | $100I/I_0$ | $d$(A.) | $100I/I_0$ | $d$(A.) | $100I/I_0$ |
| 13.4 | 64 | ------ | ------ | 13.2 | 32 | 13.4 | 12 | 13.2 | 13 | ------ | ------ | 13.2 | 100 |
| 11.6 | 100 | 11.6 | 26 | 11.5 | 25 | 11.9 | 16 | 11.6 | 21 | ------ | ------ | 11.6 | 98 |
| 10.6 | 9 | ------ | ------ | ------ | ------ | ------ | ------ | 10.8 | 15 | ------ | ------ | ------ | ------ |
| ------ | ------ | ------ | ------ | ------ | ------ | ------ | ------ | 10.3 | 21 | ------ | ------ | ------ | ------ |
| 9.50 | 24 | 9.60 | 65 | 9.50 | 43 | 9.40 | 28 | 9.60 | 27 | 9.40 | 80 | 9.60 | 84 |
| ------ | ------ | ------ | ------ | ------ | ------ | ------ | ------ | 8.66 | 21 | ------ | ------ | ------ | ------ |
| ------ | ------ | ------ | ------ | ------ | ------ | ------ | ------ | ------ | ------ | ------ | ------ | 8.04 | 37 |
| 6.86 | 62 | 6.91 | 35 | 6.75 | 61 | 6.80 | 60 | 6.80 | 60 | ------ | ------ | 6.91 | 21 |
| 6.02 | 11 | ------ | ------ | ------ | ------ | 6.02 | 16 | ------ | ------ | ------ | ------ | 6.02 | 7 |
| 5.27 | 38 | 5.21 | 30 | 5.21 | 27 | 5.21 | 48 | 5.27 | 40 | 5.15 | 100 | 5.15 | 49 |
| 4.74 | 8 | ------ | ------ | ------ | ------ | ------ | ------ | ------ | ------ | 4.67 | 30 | ------ | ------ |
| 4.46 | 9 | ------ | ------ | ------ | ------ | ------ | ------ | ------ | ------ | ------ | ------ | ------ | ------ |
| 4.41 | 8 | 4.37 | 35 | ------ | ------ | ------ | ------ | ------ | ------ | ------ | ------ | 4.41 | 23 |
| 4.31 | 16 | 4.31 | 35 | 4.31 | 32 | 4.31 | 48 | 4.31 | 54 | ------ | ------ | 4.31 | 23 |
| 4.19 | 23 | 4.15 | 17 | 4.19 | 25 | 4.15 | 20 | 4.19 | 29 | 4.11 | 55 | 4.21 | 42 |
| ------ | ------ | ------ | ------ | ------ | ------ | ------ | ------ | 4.07 | 25 | ------ | ------ | 4.13 | 35 |
| ------ | ------ | ------ | ------ | 4.04 | 25 | ------ | ------ | ------ | ------ | ------ | ------ | ------ | ------ |
| 3.95 | 48 | 3.93 | 22 | 3.95 | 39 | 3.93 | 52 | 3.93 | 46 | 3.90 | 70 | 3.98 | 49 |
| 3.72 | 17 | 3.72 | 13 | ------ | ------ | ------ | ------ | ------ | ------ | 3.73 | 50 | 3.69 | 42 |
| ------ | ------ | 3.45 | 35 | 3.42 | 21 | ------ | ------ | ------ | ------ | ------ | ------ | ------ | ------ |
| 3.36 | 16 | 3.34 | 17 | ------ | ------ | ------ | ------ | ------ | ------ | ------ | ------ | 3.37 | 23 |
| 3.26 | 18 | ------ | ------ | ------ | ------ | ------ | ------ | ------ | ------ | ------ | ------ | 3.28 | 37 |
| ------ | ------ | 3.23 | 22 | ------ | ------ | ------ | ------ | ------ | ------ | ------ | ------ | 3.25 | 41 |
| 3.16 | 25 | 3.16 | 26 | 3.15 | 29 | ------ | ------ | 3.16 | 42 | ------ | ------ | ------ | ------ |
| 3.14 | 22 | ------ | ------ | ------ | ------ | 3.14 | 36 | ------ | ------ | 3.14 | 40 | 3.12 | 28 |
| 3.00 | 31 | 2.99 | 52 | 2.98 | 54 | 2.96 | 60 | 3.00 | 46 | 3.06 | 40 | 2.98 | 89 |
| 2.92 | 94 | 2.93 | 100 | 2.91 | 100 | 2.90 | 100 | 2.92 | 100 | 2.92 | 80 | 2.94 | 75 |
| ------ | ------ | ------ | ------ | ------ | ------ | ------ | ------ | ------ | ------ | 2.87 | 90 | ------ | ------ |
| ------ | ------ | ------ | ------ | ------ | ------ | ------ | ------ | ------ | ------ | 2.81 | 90 | ------ | ------ |
| ------ | ------ | ------ | ------ | 2.72 | 23 | ------ | ------ | ------ | ------ | ------ | ------ | ------ | ------ |
| 2.68 | 17 | ------ | ------ | ------ | ------ | ------ | ------ | 2.68 | 21 | ------ | ------ | ------ | ------ |
| 2.66 | 25 | ------ | ------ | 2.66 | 14 | ------ | ------ | ------ | ------ | ------ | ------ | 2.65 | 28 |
| 2.63 | 8 | 2.63 | 14 | ------ | ------ | ------ | ------ | ------ | ------ | ------ | ------ | ------ | ------ |
| 2.59 | 44 | 2.60 | 30 | 2.58 | 36 | 2.59 | 48 | 2.59 | 42 | 2.60 | 55 | 2.62 | 53 |
| 2.55 | 15 | 2.52 | 13 | ------ | ------ | 2.52 | 16 | ------ | ------ | 2.51 | 40 | ------ | ------ |
| 2.34 | 7 | ------ | ------ | 2.33 | 7 | ------ | ------ | ------ | ------ | ------ | ------ | 2.36 | 14 |
| 2.32 | 17 | ------ | ------ | 2.31 | 10 | 2.32 | 24 | 2.32 | 17 | ------ | ------ | 2.33 | 19 |
| 2.28 | 60 | 2.30 | 13 | 2.28 | 29 | 2.28 | 60 | 2.28 | 50 | 2.25 | 30 | 2.30 | 19 |
| 2.19 | 28 | 2.17 | 13 | 2.18 | 21 | 2.18 | 24 | 2.19 | 25 | ------ | ------ | 2.21 | 19 |
| 2.10 | 21 | 2.09 | 9 | 2.09 | 14 | 2.09 | 24 | 2.09 | 25 | ------ | ------ | 2.10 | 23 |
| ------ | ------ | ------ | ------ | ------ | ------ | ------ | ------ | ------ | ------ | ------ | ------ | 2.08 | 19 |
| 1.90 | 8 | ------ | ------ | ------ | ------ | 1.90 | 12 | 1.90 | 15 | ------ | ------ | ------ | ------ |
| 1.85 | 29 | 1.84 | 22 | 1.84 | 18 | 1.84 | 32 | 1.85 | 29 | 1.84 | 30 | 1.84 | 3 |
| 1.76 | 7 | ------ | ------ | ------ | ------ | ------ | ------ | 1.75 | 13 | 1.80 | 30 | ------ | ------ |
| 1.73 | 11 | ------ | ------ | ------ | ------ | ------ | ------ | ------ | ------ | ------ | ------ | ------ | ------ |
| 1.71 | 33 | 1.72 | 17 | 1.71 | 18 | 1.71 | 24 | 1.71 | 21 | 1.69 | 25 | 1.72 | 23 |

The relative intensities and the positions of the X-ray lines are only slightly different for the various, ion-exchanged forms of zeolite H. The patterns show substantially all of the same lines, and all meet the requirements of a unit cell of approximately the same size, indicating that the spatial arrangement of silicon, oxygen and aluminum atoms, i.e., the arrangement of the AlO₄ and SiO₄ tetrahedra, are essentially identical in all forms of zeolite H. The appearance of a few minor lines, and the disappearance of others, from one form of zeolite H to another, as well as slight changes in intensities and positions of some of the X-ray lines, may be attributed to the different sizes and numbers of exchangeable cations present in the various forms of the zeolite.

The more significant $d$(A.) values, i.e., interplanar spacings in Angstrom units, for zeolite H are given in Table B.

Table B 9.5±0.2
5.21±0.10
4.16±0.08
3.95±0.07
3.14±0.06
3.01±0.05
2.92±0.04
2.60±0.04
2.28±0.04
1.85±0.03
1.72±0.02

Thus, zeolite H may be defined as a synthetic, crystalline alumino-silicate having an X-ray powder diffraction pattern characterized by at least those interplanar spacing values as set forth in Table B.

X-ray lines characteristic of zeolite H. This is an indication that one or more additional crystalline materials are mixed with zeolite H in the sample being tested. The particular X-ray technique and/or apparatus employed, the humidity, the temperature, the orientation of the powder crystals, and other variables, all of which are well known and understood to those skilled in the art of X-ray crystallography or diffraction, may also cause some variations in the intensities and positions of the X-ray lines. Thus, the X-ray data given herein to identify zeolite H are not to exclude those materials which, due to some variable mentioned above or otherwise known to those skilled in the art, fail to show all of the tabulated X-ray lines, or show a few extra ones that are permissible to the crystal system of the zeolite, or show a slight change in intensity or shift in position of some of the X-ray lines.

For satisfactory use as an adsorbent, zeolite H should be activated by at least partial dehydration. Such activation may be performed, for example, by heating the zeolite to temperatures of approximately 130° C. under atmospheric or reduced pressure, or by maintaining the zeolite at room temperature under vacuum. Unlike common adsorbents, such as charcoal and silica gel, which show adsorption selectivities based primarily on the boiling point or critical temperature of the adsorbate, activated zeolite H exhibits a selectivity based on the size, polarity, degree of unsaturation, and shape of the adsorbate molecule. Adsorption by zeolite H is generally limited to small, polar molecules.

Another property of zeolite H which contributes to its usefulness is that of adsorbing relatively large quantities of adsorbate at either very low pressures or concentrations. The novel material of this invention may therefore be utilized as a selective adsorbent in numerous gas or liquid separation processes, whereby small, polar molecules, particularly water, are separated from mixtures with other materials. The zeolite may also find use in cyclic adsorption-desorption processes for water, and possibly other adsorbates.

Samples of the potassium form of zeolite H which had been activated by dehydration at a temperature of approximately 130° C., under vacuum, were tested to determine their adsorption properties. The results obtained are set forth below in Table C. The adsorption properties were measured in a McBain adsorptive system. The zeolite samples were placed in light aluminum buckets suspended from quartz springs. They were activated in situ, and the gas or vapor under test was then admitted to the system. The gain in weight of the adsorbent was measured by the spring extensions as read by a cathetometer. In Table C the pressure given for each adsorption is the pressure of the adsorbate. The term "Weight percent adsorbed" refers to the percentage increase in the weight of the adsorbent.

Table C

| Adsorbate | Temperature, ° C. | Pressure, mm., Hg | Weight Percent Adsorbed |
|---|---|---|---|
| H$_2$O | 25 | 0.001 | 2.0 |
|  |  | 0.02 | 5.2 |
|  |  | 1.0 | 7.4 |
|  |  | 4.5 | 17.4 |
|  |  | 25 | 21.5 |
| CO$_2$ | 25 | 10 | 0.8 |
|  |  | 36 | 1.4 |
|  |  | 160 | 2.8 |
|  |  | 346 | 3.8 |
|  |  | 710 | 4.3 |
| SO$_2$ | 25 | 1 | 3.1 |
|  |  | 10 | 4.6 |
|  |  | 44 | 6.1 |
|  |  | 129 | 7.6 |
|  |  | 305 | 8.4 |
|  |  | 708 | 9.3 |
| O$_2$ | −196 | 101 | 1.2 |
| C$_2$H$_4$ | 25 | 687 | 0.1 |

From Table C, it may be seen, for example, that the activated potassium form of zeolite H, acting as a molecular sieve, may permit the separation of small, polar molecules, such as those of water, carbon dioxide, or sulfur dioxide from a mixture with other molecules, such as those of oxygen or ethylene.

Other, isomorphic forms of zeolite H may also be employed as efficient adsorbents for small, polar molecules, as illustrated by the adsorption data tabulated in Table D, below. The data was obtained in tests utilizing samples of zeolite H in which varying amounts of the potassium ions had been replaced by other exchangeable cations, as heretofore described, viz., a sodium exchanged zeolite H (Na$_2$H), a calcium exchanged zeolite H (CaH), a zinc exchanged zeolite H (ZnH), and a barium exchanged zeolite H (BaH). The samples were activated prior to adsorption by dehydration at a temperature of approximately 130° C., under vacuum, and the adsorption properties measured in a manner similar to that described above for the potassium form of zeolite H. In Table D, the pressure given for each adsorption is the pressure of the adsorbate. The term "Weight percent adsorbed" refers to the percentage increase in the weight of the adsorbent.

Table D

| Adsorbate | Temperature, ° C. | Pressure, mm. Hg | Weight Percent Adsorbed By— | | | |
|---|---|---|---|---|---|---|
|  |  |  | Na$_2$H | CaH | ZnH | BaH |
| H$_2$O | 25 | 24 | 19.2 | 11.3 | 20.2 | 1.2 |
| CO$_2$ | 25 | 675 | .3 | .3 | 5.8 |  |
| O$_2$ | −196 | 120 | 0 | .2 | .8 |  |
| CH$_3$OH | 25 | 150 | .9 | .6 | 5.1 |  |
| N$_2$ | −196 | 700 |  |  | 2.7 |  |

The results illustrated above in Table D indicate that, as in the case of the potassium form of zeolite H, isomorphic, ion-exchanged forms of the zeolite generally permit the adsorption of only small, polar molecules. However, the maximum size for adsorbate molecules, may, in the latter instance, be less narrowly limited, as compared to those adsorbed by the potassium form of zeolite H.

Zeolite H may be used as an adsorbent for the purposes indicated above in any suitable form. For example, a column of powdered crystalline material may give excellent results as may a pelleted form obtained by pressing into pellets a mixture of zeolite H and a suitable bonding agent such as clay.

What is claimed is:

1. A synthetic, crystalline zeolite having a composition, expressed in terms of mole ratios of oxides, as follows:

$$1.0 \pm 0.1 M_{\frac{2}{n}}O : Al_2O_3 : 2.0 \pm 0.1 SiO_2 : xH_2O$$

wherein "M" represents at least one exchangeable cation selected from the group consisting of metal ions of groups I, II and III of the periodic table, hydrogen ions, and ammonium ions, and "x" is any value from 0 to about 4, said synthetic, crystalline zeolite having an X-ray powder diffraction pattern essentially as shown in the following table:

*Zeolite H X-ray diffraction table—principal line values in Angstrom units*

9.5 ±0.2
5.21±0.10
4.16±0.08
3.95±0.07
3.14±0.06
3.01±0.05
2.92±0.04
2.60±0.04
2.28±0.04
1.85±0.03
1.72±0.02

2. A synthetic, crystalline zeolite according to claim 1, wherein at least a substantial portion of the exchangeable cations are potassium ions and the X-ray powder diffraction pattern is substantially as shown in the following table:

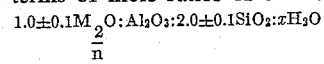

| K$_2$H | |
|---|---|
| d(A.) | 100I/I$_0$ |
| 13.4 | 64 |
| 11.6 | 100 |
| 10.6 | 9 |
| 9.50 | 24 |
| 6.86 | 62 |
| 6.02 | 11 |
| 5.27 | 38 |
| 4.74 | 8 |
| 4.46 | 9 |
| 4.41 | 8 |
| 4.31 | 16 |
| 4.19 | 23 |
| 3.95 | 48 |
| 3.72 | 17 |
| 3.36 | 16 |
| 3.26 | 18 |
| 3.16 | 25 |
| 3.14 | 22 |
| 3.00 | 31 |
| 2.92 | 94 |
| 2.68 | 17 |
| 2.66 | 25 |
| 2.63 | 8 |
| 2.59 | 44 |
| 2.55 | 15 |
| 2.34 | 7 |
| 2.32 | 17 |
| 2.28 | 60 |
| 2.19 | 28 |
| 2.10 | 21 |
| 1.90 | 8 |
| 1.85 | 29 |
| 1.76 | 7 |
| 1.73 | 11 |
| 1.71 | 33 |

3. A synthetic, crystalline zeolite according to claim 1, wherein at least a substantial portion of the exchangeable cations are sodium ions and the X-ray powder diffraction pattern is substantially as shown in the following table:

| Na₂H | |
|---|---|
| d(A.) | 100I/I₀ |
| 11.6 | 28 |
| 9.60 | 65 |
| 6.91 | 35 |
| 5.21 | 30 |
| 4.37 | 35 |
| 4.31 | 35 |
| 4.15 | 17 |
| 3.98 | 22 |
| 3.72 | 13 |
| 3.45 | 35 |
| 3.34 | 17 |
| 3.23 | 22 |
| 3.16 | 26 |
| 2.99 | 52 |
| 2.93 | 100 |
| 2.63 | 14 |
| 2.60 | 30 |
| 2.52 | 13 |
| 2.30 | 13 |
| 2.17 | 13 |
| 2.09 | 9 |
| 1.84 | 22 |
| 1.72 | 17 |

4. A synthetic, crystalline zeolite according to claim 1, wherein at least a substantial portion of the exchangeable cations are magnesium ions and the X-ray powder diffraction pattern is substantially as shown in the following table:

| MgH | |
|---|---|
| d(A.) | 100I/I₀ |
| 13.4 | 12 |
| 11.9 | 16 |
| 9.40 | 28 |
| 6.80 | 60 |
| 6.02 | 16 |
| 5.21 | 48 |
| 4.31 | 48 |
| 4.15 | 20 |
| 3.93 | 52 |
| 3.14 | 36 |
| 2.96 | 60 |
| 2.90 | 100 |
| 2.59 | 48 |
| 2.52 | 16 |
| 2.32 | 24 |
| 2.28 | 60 |
| 2.18 | 24 |
| 2.09 | 24 |
| 1.90 | 12 |
| 1.84 | 32 |
| 1.71 | 24 |

5. A synthetic, crystalline zeolite according to claim 1, wherein at least a substantial portion of the exchangeable cations are calcium ions and the X-ray powder diffraction pattern is substantially as shown in the following table:

| CaH | |
|---|---|
| d(A.) | 100I/I₀ |
| 9.40 | 80 |
| 5.15 | 100 |
| 4.67 | 30 |
| 4.11 | 55 |
| 3.90 | 70 |
| 3.73 | 50 |
| 3.14 | 40 |
| 3.06 | 40 |
| 2.92 | 80 |
| 2.87 | 90 |
| 2.81 | 90 |
| 2.60 | 55 |
| 2.51 | 40 |
| 2.25 | 30 |
| 1.84 | 30 |
| 1.80 | 30 |
| 1.69 | 25 |

6. A synthetic, crystalline zeolite according to claim 1, wherein at least a substantial portion of the exchangeable cations are zinc ions and the X-ray powder diffraction pattern is substantially as shown in the following table:

| ZnH | |
|---|---|
| d(A.) | 100I/I₀ |
| 13.2 | 100 |
| 11.6 | 98 |
| 9.60 | 84 |
| 8.04 | 37 |
| 6.91 | 21 |
| 6.02 | 7 |
| 5.15 | 49 |
| 4.41 | 28 |
| 4.31 | 23 |
| 4.21 | 42 |
| 4.13 | 35 |
| 3.98 | 49 |
| 3.69 | 42 |
| 3.37 | 23 |
| 3.28 | 37 |
| 3.25 | 41 |
| 3.12 | 28 |
| 2.98 | 89 |
| 2.94 | 75 |
| 2.65 | 28 |
| 2.62 | 58 |
| 2.36 | 14 |
| 2.33 | 19 |
| 2.30 | 19 |
| 2.21 | 19 |
| 2.10 | 23 |
| 2.03 | 19 |
| 1.84 | 3 |
| 1.72 | 23 |

7. A synthetic, crystalline zeolite according to claim 1, wherein at least a substantial portion of the exchangeable cations are cerous ions and the X-ray powder diffraction pattern is substantially as shown in the following table:

| Ce₂H₃ | |
|---|---|
| d(A.) | 100I/I₀ |
| 13.2 | 13 |
| 11.6 | 21 |
| 10.8 | 15 |
| 10.3 | 21 |
| 9.60 | 27 |
| 8.66 | 21 |
| 6.80 | 60 |
| 5.27 | 40 |
| 4.31 | 54 |
| 4.19 | 29 |
| 4.07 | 25 |
| 3.93 | 46 |
| 3.16 | 42 |
| 3.00 | 46 |
| 2.92 | 100 |
| 2.68 | 21 |
| 2.59 | 42 |
| 2.32 | 17 |
| 2.28 | 50 |
| 2.19 | 25 |
| 2.09 | 25 |
| 1.90 | 15 |
| 1.85 | 29 |
| 1.75 | 13 |
| 1.71 | 21 |

8. A synthetic, crystalline zeolite according to claim 1, wherein at least a substantial portion of the exchangeable cations are ammonium ions and the X-ray powder diffraction pattern is substantially as shown in the following table:

| (NH₄)₂H | |
|---|---|
| d(A.) | 100I/I₀ |
| 13.2 | 32 |
| 11.5 | 25 |
| 9.50 | 43 |
| 6.75 | 61 |
| 5.21 | 27 |
| 4.31 | 32 |
| 4.19 | 25 |
| 4.04 | 25 |
| 3.95 | 39 |
| 3.42 | 21 |
| 3.15 | 29 |
| 2.98 | 54 |
| 2.91 | 100 |
| 2.72 | 23 |
| 2.66 | 14 |
| 2.58 | 36 |
| 2.33 | 7 |
| 2.31 | 10 |
| 2.28 | 29 |
| 2.18 | 21 |
| 2.09 | 14 |
| 1.84 | 18 |
| 1.71 | 18 |

9. A synthetic, crystalline zeolite having a composition, expressed in terms of mole ratios of oxides, as follows:

$$1.0 \pm 0.1 K_2O : Al_2O_3 : 2.0 \pm 0.1 SiO_2 : xH_2O$$

wherein "$x$" is any value from 0 to about 4, said synthetic, crystalline zeolite having an X-ray powder diffraction pattern essentially as shown in the following table:

Zeolite H X-ray diffraction table—principal line values in Angstrom units

| | |
|---|---|
| 9.5 ±0.2 | 2.92±0.04 |
| 5.21±0.10 | 2.60±0.04 |
| 4.16±0.08 | 2.28±0.04 |
| 3.95±0.07 | 1.85±0.03 |
| 3.14±0.06 | 1.72±0.02 |
| 3.01±0.05 | |

10. A synthetic, crystalline zeolite having a composition, expressed in terms of mole ratios of oxides, as follows:

$$1.0 \pm 0.1 K_2O : Al_2O_3 : 2.0 \pm 0.1 SiO_2 : xH_2O$$

wherein "$x$" is any value from 0 to about 4, said synthetic, crystalline zeolite having an X-ray powder diffraction pattern essentially as shown in the following table:

| K₂H | |
|---|---|
| d(A.) | 100I/I₀ |
| 13.4 | 64 |
| 11.6 | 100 |
| 10.6 | 9 |
| 9.50 | 24 |
| 6.86 | 62 |
| 6.02 | 11 |
| 5.27 | 38 |
| 4.74 | 8 |
| 4.46 | 9 |
| 4.41 | 8 |
| 4.31 | 16 |
| 4.19 | 23 |
| 3.95 | 48 |
| 3.72 | 17 |
| 3.36 | 16 |
| 3.26 | 18 |
| 3.16 | 25 |
| 3.14 | 22 |
| 3.00 | 31 |
| 2.92 | 94 |
| 2.68 | 17 |
| 2.66 | 25 |
| 2.63 | 8 |
| 2.59 | 44 |
| 2.55 | 15 |
| 2.34 | 7 |
| 2.32 | 17 |
| 2.28 | 60 |
| 2.19 | 28 |
| 2.10 | 21 |
| 1.90 | 8 |
| 1.85 | 29 |
| 1.76 | 7 |
| 1.73 | 11 |
| 1.71 | 33 |

11. A process for preparing a crystalline zeolite having a composition, expressed in terms of mole ratios of oxides, as follows:

$$1.0 \pm 0.1 K_2O : Al_2O_3 : 2.0 \pm 0.1 SiO_2 : xH_2O$$

wherein "$x$" is any value from 0 to about 4, said crystalline zeolite having an X-ray powder diffraction pattern essentially shown in the following table:

Zeolite H X-ray diffraction table—principal line values in Angstrom units 9.5 ±0.2
5.21±0.10
4.16±0.08
3.95±0.07
3.14±0.06
3.01±0.05
2.92±0.04
2.60±0.04
2.28±0.04
1.85±0.03
1.72±0.02 which process comprises preparing an aqueous potassium aluminosilicate mixture whose composition, expressed in terms of mole ratios of oxides, falls within the following ranges:

$K_2O/SiO_2$ of from about 1 to about 4
$SiO_2/Al_2O_3$ of from about 1.5 to about 2.4
$H_2O/K_2O$ of from about 23 to about 34 and maintaining such mixture at a temperature of between about 75° C. and about 120° C. until the desired crystalline zeolite product is formed.

12. A process for preparing a crystalline zeolite having a composition, expressed in terms of mole ratios of oxides, as follows:

$$1.0 \pm 0.1 K_2O : Al_2O_3 : 2.0 \pm 0.1 SiO_2 : xH_2O$$

wherein "$x$" is any value from 0 to about 4, said crystalline zeolite having an X-ray powder diffraction pattern essentially shown in the following table:

Zeolite H X-ray diffraction table—principal line values in Angstrom units 9.5 ±0.2
5.21±0.10
4.16±0.08
3.95±0.07
3.14±0.06
3.01±0.05
2.92±0.04
2.60±0.04
2.28±0.04
1.85±0.03
1.72±0.02 which process comprises preparing an aqueous potassium aluminosilicate mixture whose composition, expressed in terms of mole ratios of oxides, falls within the following ranges:

$K_2O/SiO_2$ of from about 1 to about 4
$SiO_2/Al_2O_3$ of from about 1.5 to about 2.4
$H_2O/K_2O$ of from about 23 to about 34 maintaining such mixture at a temperature of approximately 100° C. until the desired crystalline zeolite product is formed, and separating the resulting crystals from the reactant mother liquor.

13. A process for preparing a crystalline zeolite having a composition, expressed in terms of mole ratios of oxides, as follows:

$$1.0 \pm 0.1 K_2O : Al_2O_3 : 2.0 \pm 0.1 SiO_2 : xH_2O$$

wherein "$x$" is any value from 0 to about 4, said crystalline zeolite having an X-ray powder diffraction pattern essentially shown in the following table:

| K₂H | |
|---|---|
| d(A.) | 100I/I₀ |
| 13.4 | 64 |
| 11.6 | 100 |
| 10.6 | 9 |
| 9.50 | 24 |
| 6.86 | 62 |
| 6.02 | 11 |
| 5.27 | 38 |
| 4.74 | 8 |
| 4.46 | 9 |
| 4.41 | 8 |
| 4.31 | 16 |
| 4.19 | 23 |
| 3.95 | 48 |
| 3.72 | 17 |
| 3.36 | 16 |
| 3.26 | 18 |
| 3.16 | 25 |
| 3.14 | 22 |
| 3.00 | 31 |
| 2.92 | 94 |
| 2.68 | 17 |
| 2.66 | 25 |
| 2.63 | 8 |
| 2.59 | 44 |
| 2.55 | 15 |
| 2.34 | 7 |
| 2.32 | 17 |
| 2.28 | 60 |
| 2.19 | 28 |
| 2.10 | 21 |
| 1.90 | 8 |
| 1.85 | 29 |
| 1.76 | 7 |
| 1.73 | 11 |
| 1.71 | 33 | which process comprises preparing an aqueous potassium aluminosilicate mixture whose composition, expressed in terms of mole ratios of oxides, falls within the following ranges:

$K_2O/SiO_2$ of from about 1 to about 4
$SiO_2/Al_2O_3$ of from about 1.5 to about 2.4
$H_2O/K_2O$ of from about 23 to about 34 maintaining such mixture at a temperature of approximately 100° C. until the desired crystalline zeolite product is formed, and separating the resulting crystals from the reactant mother liquor.

14. A dehydrated synthetic crystalline zeolite having a composition, expressed in terms of mole ratios of oxides, as follows:

$$1.0 \pm 0.1 M_{\frac{2}{n}}O : Al_2O_3 : 2.0 \pm 0.1 SiO_2$$

wherein "M" represents at least one exchangeable cation selected from the group consisting of metal ions of groups I, II, and III of the periodic table, hydrogen ions, and ammonium ions, said synthetic dehydrated crystalline zeolite having an X-ray powder diffraction pattern essentially as shown in the following table:

*Zeolite H X-ray diffraction table—principal line values in Angstrom units*

9.5 ±0.2
5.21±0.10
4.16±0.08
3.95±0.07
3.14±0.06
3.01±0.05
2.92±0.04
2.60±0.04
2.28±0.04
1.85±0.03
1.72±0.02

15. A dehydrated synthetic crystalline zeolite having a composition, expressed in terms of mole ratios of oxides, as follows:

$$1.0 \pm 0.1 K_2O : Al_2O_3 : 2.0 \pm 0.1 SiO_2$$

said synthetic dehydrated crystalline zeolite having an X-ray powder diffraction pattern essentially as shown in the following table:

| K₂H | |
|---|---|
| d(A.) | 100I/I₀ |
| 13.4 | 64 |
| 11.6 | 100 |
| 10.6 | 9 |
| 9.50 | 24 |
| 6.86 | 62 |
| 6.02 | 11 |
| 5.27 | 38 |
| 4.74 | 8 |
| 4.46 | 9 |
| 4.41 | 8 |
| 4.31 | 16 |
| 4.19 | 23 |
| 3.95 | 48 |
| 3.72 | 17 |
| 3.36 | 16 |
| 3.26 | 18 |
| 3.16 | 25 |
| 3.14 | 22 |
| 3.00 | 31 |
| 2.92 | 94 |
| 2.68 | 17 |
| 2.66 | 25 |
| 2.63 | 8 |
| 2.59 | 44 |
| 2.55 | 15 |
| 2.34 | 7 |
| 2.32 | 17 |
| 2.28 | 60 |
| 2.19 | 28 |
| 2.10 | 21 |
| 1.90 | 8 |
| 1.85 | 29 |
| 1.76 | 7 |
| 1.73 | 11 |
| 1.71 | 33 |

References Cited in the file of this patent

UNITED STATES PATENTS 2,283,172    Bates    May 19, 1942
2,841,471    Sensel    July 1, 1958

OTHER REFERENCES

Breck et al.: "J. Am. Chem. Soc.," 78, 5963–5977 (1956).
Barrer et al.: I. "J. Chem. Soc.," 1267–1278 (1951).
Barrer et al.: II. "J. Chem. Soc.," 1561–1571 (1952).
Barrer et al.: III. "J. Chem. Soc.," 2882–2903 (1956).
Mellor: "Comprehensive Treatise on Inorganic Theoretical Chemistry," vol. 6, Part 2, page 568, first paragraph.